(No Model.)
M. R. SKINNER.
FISH TRAP HOOK.
No. 286,494.
Patented Oct. 9, 1883.
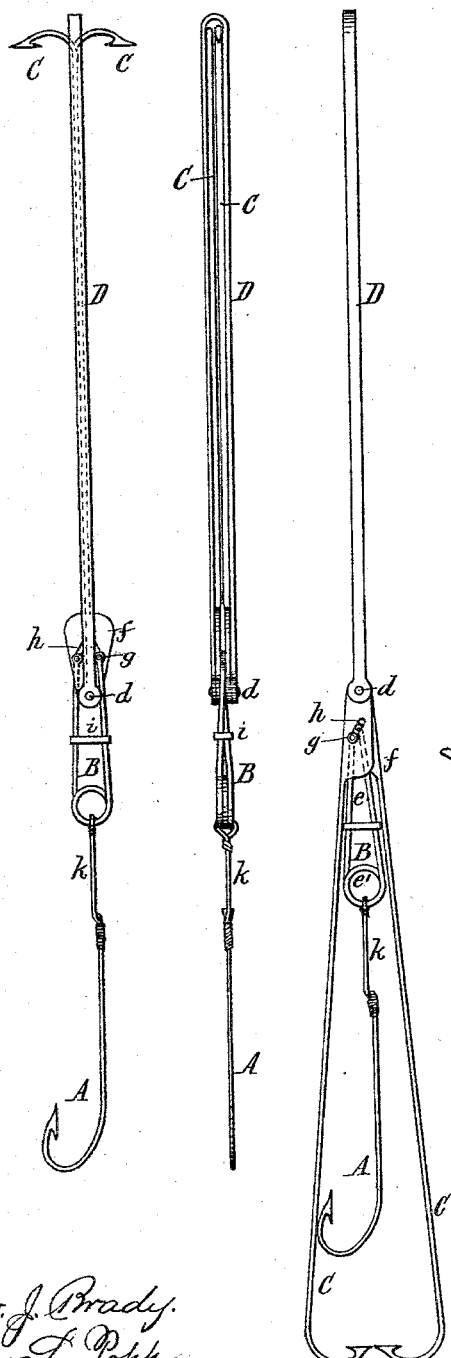
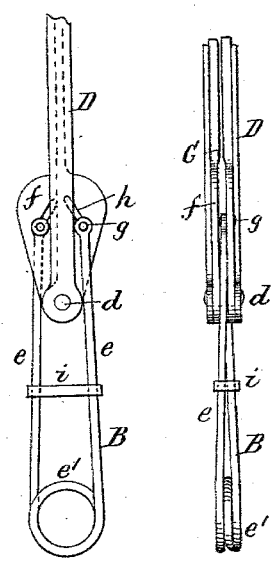
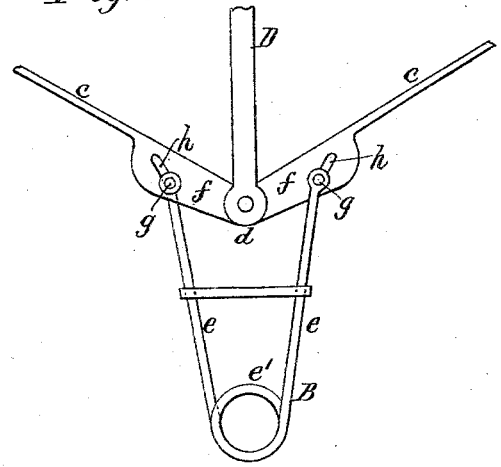
Witnesses:
Edw. J. Brady.
Theo. L. Popp.
M. R. Skinner, Inventor.
By Wilhelm & Bonner
Attorneys.

UNITED STATES PATENT OFFICE.

MERRILL R. SKINNER, OF HAMBURG, NEW YORK.

FISH TRAP-HOOK.

SPECIFICATION forming part of Letters Patent No. 286,494, dated October 9, 1883.

Application filed March 13, 1883. (No model.)

*To all whom it may concern:*

Be it known that I, MERRILL R. SKINNER, of Hamburg, in the county of Erie and State of New York, have invented a new and useful Improvement in Fish-Hooks, of which the following is a specification.

This invention relates to an improvement in that class of fish-hooks which are provided with auxiliary hooks or gaff-hooks, so connected with the bait-hook that a pull on the bait-hook will cause the gaff-hooks to swing down and seize the fish or other animal which is pulling on the bait-hook.

The object of my invention is to produce a fish-hook having such auxiliary or gaff hooks, and which shall be very light, simple, and strong in construction and effective in its operation.

My invention consists of the particular improvements which will be hereinafter fully set forth, and pointed out in the claims.

In the accompanying drawings, Figure 1 represents a side elevation of a fish-hook provided with my improvements, with the gaff-hooks in an elevated position. Fig. 2 is an elevation at right angles to Fig. 1. Fig. 3 is a side elevation, showing the gaff-hooks swung down. Fig. 4 is a side elevation, on an enlarged scale, of the means whereby the gaff-hooks are connected with the bait-hook. Fig. 5 is an elevation at right angles to Fig. 4. Fig. 6 is a side elevation of the pivoted ends of the gaff-hooks and connecting parts, the gaff-hooks being partly opened.

Like letters of reference refer to like parts in the several figures.

A represents the bait-hook; B, a spring, to which the bait-hook is attached; C C, the gaff-hooks; and D, an elongated bail or frame, to which the gaff-hooks are pivoted at *d*, and which is connected at its upper end to the line. The gaff-hooks C are pivoted between the jaws of the bail or frame D. The spring B is composed of two arms, *e e*, connected by a coil, *e'*, which tends to close the arms *e* and retains them in the position represented in Figs. 1, 3, and 4. The gaff-hooks C are flattened near their pivots *d*, as shown at *f*, and the ends of the spring B are connected to the flattened portions of the gaff-hooks by rivets *g*, passing through inclined slots *h* in the flat portions *f* of the gaff-hooks. The bail or frame D is made long enough to receive the gaff-hooks C when in an elevated position, as represented in Figs. 1 and 2. The gaff-hooks are held in this position by the spring B, which resists the opening of the hooks. When the hooks are in this position the ends of the spring-arms *e* rest in the outer portions of the inclined slots *h* on opposite sides of the bail or frame D, as represented in Fig. 1.

The bait-hook A is attached to the coil *e'* of the spring B by a snood, *k*. When a fish or other animal seizes the bait-hook A and pulls on the same, the draft is transmitted by the spring-arms *e* to the gaff-hooks C, which latter are swung outwardly and downwardly on their pivots, whereby the spring-arms *e* are distended, as represented in Fig. 6, until the gaff-hooks have passed a position at right angles to the bail D, when they begin to close, which movement is accelerated by the pressure of the spring-arms *e*. The inclined position of the slots *h* produces a wedging action, which tends to facilitate and accelerate the closing of the hooks C. As the spring-arms *e* are attached to the gaff-hooks C at a short distance from their pivots *d*, the downward movement of the gaff-hooks will be very quick, thereby enabling the gaff-hooks to seize the fish or other animal immediately after the same has taken hold of the bait-hook.

For some kinds of fish it is desirable to use a very light spring for connecting the bait-hook with the gaff-hooks, and if such a light spring is used in the device and it is desired to use the hook with a greater spring-pressure, this is readily accomplished by stretching a rubber band, *i*, over the spring-arms *e*, as represented in the drawings. The rubber band can be moved toward or from the coil *e'*, thereby reducing or increasing the pressure on the spring-arms, as may be desired. By increasing or reducing the length of the snood *k* the point at which the fish is seized by the gaff-hooks can be regulated. The gaff-hooks are set by simply pressing them back into the frame D, in which position they are securely held by the spring, the whole device being very light and compact, and therefore not liable to scare fish or game.

I claim as my invention—

1. The combination, with a bail D, of gaff-hooks C, pivoted to the bail, a spring, B, having its arms *e* attached to the gaff-hooks near their pivots, and a bait-hook, A, attached to the spring B at the junction of its arms, substantially as set forth.

2. The combination of the bail or frame D, gaff-hooks C C, pivoted to the frame D, and provided with inclined slots *h*, a spring, B, constructed with arms *e*, engaging in the slots *h* of the gaff-hooks, and a bait-hook, A, attached to the spring B, substantially as set forth.

MERRILL R. SKINNER.

Witnesses:
JNO. J. BONNER,
CHAS. F. GEYER.